United States Patent
Dozeman et al.

(10) Patent No.: US 7,452,940 B2
(45) Date of Patent: Nov. 18, 2008

(54) PROCESS FOR THE PREPARATION OF A DYNAMICALLY VULCANIZED THERMOPLASTIC ELASTOMER

(75) Inventors: Alberto O Dozeman, Born (NL); Ryszard Brzoskowski, Acton, MA (US); Yundond Wang, Leominster, MA (US)

(73) Assignee: DSM I.P. Assets B.V., Heerlen (NL)

( * ) Notice: Subject to any disclaimer, the term of this patent is extended or adjusted under 35 U.S.C. 154(b) by 267 days.

(21) Appl. No.: 10/491,569

(22) PCT Filed: Oct. 10, 2002

(86) PCT No.: PCT/NL02/00647

§ 371 (c)(1),
(2), (4) Date: Dec. 16, 2004

(87) PCT Pub. No.: WO03/031150

PCT Pub. Date: Apr. 17, 2003

(65) Prior Publication Data

US 2005/0085591 A1    Apr. 21, 2005

Related U.S. Application Data

(60) Provisional application No. 60/328,105, filed on Oct. 11, 2001, now abandoned.

(51) Int. Cl.
*C08L 23/00* (2006.01)
*C08L 23/04* (2006.01)
*C08L 9/00* (2006.01)

(52) U.S. Cl. .................... 525/191; 525/232; 525/240
(58) Field of Classification Search ............... 525/191, 525/232, 240
See application file for complete search history.

(56) References Cited

U.S. PATENT DOCUMENTS

| 4,454,092 A | 6/1984 | Shimizu |
| 4,873,288 A | 10/1989 | Komatsu |
| 5,100,947 A | 3/1992 | Puydak |
| 5,457,159 A * | 10/1995 | Fassina et al. ............... 525/133 |
| 5,895,790 A * | 4/1999 | Good .......................... 521/47 |

FOREIGN PATENT DOCUMENTS

| EP | 72203 | 2/1983 |
| EP | 107 635 | 5/1984 |
| EP | 311 451 | 4/1989 |

* cited by examiner

*Primary Examiner*—Nathan M Nutter
(74) *Attorney, Agent, or Firm*—Nixon & Vanderhye P.C.

(57) ABSTRACT

The present invention relates to a process for the preparation of a dynamically vulcanized thermoplastic elastomer comprising simultaneously mixing a thermoplastic polyolefin, a vulcanizable rubber and a curing agent in a co-rotating twin-screw extruder whereby the vulcanizable rubber is cured during mixing. The residence time in the extruder is less than 40 sec, the ratio of specific Energy (Espec)/residence time is at least 24 kW/kg and the ratio of the residence time/(Length/Diameter) is less than 0.60 sec. The invention further relates to the dynamically vulcanized thermoplastic elastomer obtainable by the process and to the use of the dynamically vulcanized thermoplastic elastomer in sealing systems, building profiles and extrusion applications.

13 Claims, No Drawings

PROCESS FOR THE PREPARATION OF A DYNAMICALLY VULCANIZED THERMOPLASTIC ELASTOMER

CROSS REFERENCE TO RELATED APPLICATION

This application is the National Phase of International Application PCT/NL02/00647 filed Oct. 10, 2002 which designated the U.S., and that International Application was published under PCT Article 21(2) in English, which further claims the benefit of priority to U.S. provisional application Ser. No. 60/328,105, filed Oct. 11, 2001.

The present invention relates to a process for the preparation of a dynamically vulcanized thermoplastic elastomer comprising melting and mixing a thermoplastic polyolefin, a vulcanizable rubber and a curing agent in a co-rotating twin-screw extruder, whereby the vulcanizable rubber is cured during mixing. The invention further relates to the dynamically vulcanized thermoplastic elastomer and to articles comprising the dynamically vulcanized thermoplastic elastomer.

Dynamically vulcanized thermoplastic elastomers have a combination of both thermoplastic and elastic properties. The thermoplastic elastomers are prepared by mixing and shearing a thermoplastic polymer, a vulcanizable rubber and a curing agent. The vulcanizable rubber is cured and is intimately and uniformly dispersed as a particulate phase within a continuous phase of the thermoplastic polymer.

From EP-A-107635 a process is known for the preparation of a dynamically vulcanized thermoplastic elastomer comprising a blend of a thermoplastic polymer and a vulcanizable rubber which is subjected to high shear during vulcanization. A disadvantage is that the black speck level of the dynamically vulcanized thermoplastic elastomer manufactured by the above process is inadequate.

It is an object of the present invention to provide a process for the preparation of a dynamically vulcanized thermoplastic elastomer comprising melting and mixing a thermoplastic polyolefin a vulcanizable rubber, and a curing agent in a co-rotating twin-screw extruder whereby the vulcanizable rubber is cured during mixing, which overcomes the above cited problem.

Surprisingly it has been found that when,
  tr<40 sec
  Espec/tr>=24 kW/kg
  tr/(L/D)<0.60 sec
whereby
  tr is understood to be the residence time in the extruder
  Espec is defined as specific Energy in the extruder
  (L/D) is understood to be Length/Diameter ratio of the screws in the extruder.

A dynamically vulcanized thermoplastic elastomer has been produced with a lower black speck level. A further advantage is that the dynamically vulcanized thermoplastic elastomer shows a less yellow colour and has a better odour. An additional advantage is that the dynamically vulcanized thermoplastic elastomer has a better extrusion quality, which means less surface defects, a better surface roughness, surface smoothness and gloss at high extrusion rates. It is moreover surprising that by using the process of the present invention a dynamically vulcanized thermoplastic elastomer can be produced with better elastic properties.

From EP-A-72203 a process is known for the preparation of a partially dynamically vulcanized thermoplastic elastomer which comprises melting and mixing a peroxide curable olefin copolymer rubber, a peroxide-decomposing polyolefin resin and an organic peroxide compound in a twin screw extruder in which the dynamic heat treatment is carried out under the condition: x<=200 wherein x stands for weight of the copolymer rubber (g/100 particle) and y>=0.003.x+ 0.12 and y stands for specific Energy at the extrusion (kWhr/kg).

A disadvantage of this process is that rubber particles with a specific dimension have to be used.

Any co-rotating twin screw extruder capable of generating a ratio of specific Energy/residence time of at least 24 kW/kg and a ratio of the residence time/(Length/Diameter) of less than 0.60 sec is usefull for carrying out the process of the present invention. Specific Energy (Espec) is here and hereafter defined as the mechanical energy in kWh supplied by the motor of the extruder to the thermoplastic elastomer per kg (kW.h/kg). The specific Energy is for example at least 0.20 kWh/kg. Preferably, the specific Energy is at least 0.24 KWh/kg, more preferably the specific Energy is at least 0.28 kWh/kg. The residence time (tr) is the time period between the dosing of few pieces of contrasting color granulate together with the thermoplastic polyolefine, the vulcanizable rubber and the curing agent in the entry port of the extruder and the first moment that a change in color at the die exit is noticable. The residence time in the extruder is preferably less than 35 sec, more preferably less than 30 sec, most preferably less than 25 sec.

Twin-screw extruders, suitable in the process of the present invention have screws which may vary in diameter from 25 mm to 200 mm, the ratio of Length of the screws over the Diameter of the screws (l/D) may vary from 16-60, preferably from 38-60, more preferably from 42-56.

The rotation speed of the screws may vary from 500-1200 revolutions per minute (rpm), but is preferably at least 700 rpm, more preferably at least 900 rpm, most preferably 1100 rpm.

An extruder satisfactory for carrying out the process of the present invention is for example a mega-compounder extruder produced by Werner& Pfleiderer™, Germany or an Ultra-torque (UT) Berstroff extruder.

Examples of suitable thermoplastic polyolefins used in the dynamically vulcanized thermoplastic elastomer according to the present invention are thermoplastic polyolefin homo- and copolymers or blends thereof. For example homopolymers of ethylene or propylene, copolymers of ethylene and propylene, copolymers of ethylene and an alpha-olefin with 4-12 carbon atoms or copolymers of propylene and an alpha-olefin with 4-12 carbon atoms may be used. Preferably, a homopolymer of propylene is used.

Examples of vulcanizable rubbers that may be used in the dynamically vulcanized thermoplastic elastomer according to the present invention are ethylene-propylene copolymers, hereinafter called EPM, ethylene-propylene-diene terpolymers, hereinafter called EPDM, styrene butadiene rubber, nitrile butadiene rubber, isobutene-isoprene rubber, styrene-ethylene/styrene-butadiene block copolymers, butyl rubber, isobutylene-p-methylstyrene copolymers or brominated isobutylene-p-methylstyrene copolymers, natural rubber or blends of these.

Preferably, EPDM or EPM is used as vulcanizable rubber. Most preferably, EPDM is used as vulcanizable rubber. The EPDM preferably contains 50-70 parts by weight ethylene monomer units, 48-30 parts by weight monomer units originating from an alpha-olefin and 2-12 parts by weight monomer units originating from a non-conjugated diene. As alpha-olefin use is preferably made of propylene. As non-conjugated diene use is preferably made of dicyclopentadiene (DCPD), 5-ethylidene-2-norbornene (ENB) or vinylnorbornene (VNB).

The vulcanizable rubber is at least partially vulcanized. Those ordinarily skilled in the art will appropriate quantities, types of curing agents and vulcanization conditions required to carry out the vulcanization of the rubber.

The vulcanizable rubber can be vulcanized using varying amounts of curing agent, varying temperatures and varying time of vulcanization as long as the conditions of the process according to the present invention are fullfilled. Examples of curing agents which may be used in the preparation of the dynamically vulcanized thermoplastic elastomer according to the present invention are sulfur, sulfurous compounds, metal oxides, maleimides, phenol resins or peroxides with or without accelerators and/or co-agents. Curing agents, accelerators and co-agents are known to the skilled person and are for example described in U.S. Pat. No. 5,100,947. It is also possible to use siloxane compounds as curing agent, for example hydrosilane or vinylalkoxysilane. The vulcanizable rubber is preferably vulcanized with the aid of phenol resins, siloxanes or peroxides as curing agent.

The invention also relates to the dynamically vulcanized thermoplastic elastomer obtainable by the process of the present invention. The degree of vulcanization of the dynamically vulcanized thermoplastic elastomer can be expressed in terms of gel content or conversely, extractable components. Gel content reported as percent gel is determined by a procedure which comprises determining the amount of insoluble polymer by soaking a specimen of the thermoplastic elastomer for 48 hours in organic solvent at room temperature and then weighting the dried residue and making suitable corrections based upon knowledge of the composition. Thus corrected initial and final weights are obtained by substracting from the initial weight, the weight of soluble components, other than the rubber to be vulcanized, for example extender oils, plasticizers and components of the compositions soluble in organic solvent. The expression is well known in the art and described in U.S. Pat. No. 5,100,947.

The vulcanized rubber in the dynamically vulcanized thermoplastic elastomer according to the present invention is at least partly vulcanized and the gel content may vary between 60 and 100%. Preferably, the gel content of the vulcanized rubber is in excess of 80%. More preferably, the vulcanized rubber is fully vulcanized and the gel content is in excess of 95%.

The dynamically vulcanized thermoplastic elastomer according to the present invention may, for example, comprise between 5-35% by weight of the thermoplastic polyolefin and between 65-95% by weight of the vulcanizable rubber based on the weight of the dynamically vulcanized thermoplastic elastomer. Preferably, the dynamically vulcanized thermoplastic elastomers comprises between 7-25% by weight of the thermoplastic polyolefin and between 75-93% by weight of the vulcanizable rubber based on the weight of the dynamically vulcanized thermoplastic elastomer.

The dynamically vulcanized thermoplastic elastomer according to the present invention optionally comprises other customary additives which may be compounded. Examples of such additives are reinforcing and non-reinforcing fillers, plasticizers, antioxidants, rubber processing oil, extender oils, lubricants, antiblocking agents, antistatic agents, waxes, foaming agents, pigments, flame retardants and other processing aids known in the rubber compounding art. Examples of fillers that may be used are calcium carbonate, clays, silica, talc, titanium dioxide, carbon or mixtures of any of these. Examples of rubber processing oils that may be used are paraffinic, naphthenic or aromatic oil derived from petroleum fractions or mixtures of any of these.

In the process of the present invention the thermoplastic polyolefine, the vulcanizable rubber, the curing agent and the customary additives may, all and in whole, be fed into the entry port of the extruder. It is also possible that one or more of the thermoplastic polyolefine, the vulcanizable rubber, the curing agent or the additives are fed in whole or in part at a place downstream in the extruder. If the thermoplastic polyolefine, the vulcanizable rubber, the curing agent and the customary additives are fed at different places, the vulcanizable rubber and a part of the thermoplastic polyolefine are dosed in the entry port of the extruder together with the additives and mixed. After the vulcanizable rubber, the thermoplastic polyolefine and the additives have been properly dispersed, the curing agent and additional thermoplastic polyolefine may be added. It is also possible to add additional extender oil, plasticizer, colorants, thermoplastic polyolefine or curing agent at another entry port located in about the middle of the extruder.

The present invention further relates to the use of the dynamically vulcanized thermoplastic elastomer in sealing systems, building profiles or extrusion applications.

The present invention also relates to articles comprising the dynamically vulcanized thermoplastic elastomer. These articles may be applied in cars, equipment and constructions. Examples hereof are airbag covers, fuel lines, hoses, dashboard foils, spoilers, mud flaps, seals, boots and strips.

The invention will be elucidated by means of the following examples and comparative experiments without being limited thereto.

All dynamic vulcanizations were executed on a co-rotating Werner & Pfleiderer™ twin screw extruder. The L/D ratio of the screws in the extruder was 52 (Examples I, II, III and comparative experiment A). The L/D ratio in comparative experiment B was 44. The throughput was varying from 850-3700 kg/hr at screw speeds varying from 500-1200 rpm. The melt temperature at the end of the extruder was between 260-300° C. All the indicated raw materials were added on a hopper except 40 parts of oil which were injected in the extruder, after the dynamic vulcanization had been started.

The properties of the dynamically vulcanized thermoplastic elastomers were analysed on injection moulded parts.

Different properties were analysed;
   Hardness, Shore A, according to ASTM D-2240-91
   Tensile strength, Mpa, according to ASTM D-412-92, Method A, Die C
   Elongation, %, according to ASTM D-412-92, Method A, Die C
   100% modulus, Mpa, according to ASTM D-412-92, Method A, Die C
   Compression set (CS), %, according to ASTM D-395-89, Method B
   Density, according to ASTM D-792-91
   Colour b-value was measured using a BYK colorgard 9000, calorimeter. It uses a 45 degree circumferential/0 degree viewing geometry. The diffuse reflectance from the surface is measured by filling a cup with pellets and the measurements taken when the instrument looks up into the cup from the bottom surface. It measures 5 times and averages those results to give one test reading.
   Odour is measured according to VDA 270.
   Extrusion quality was measured visual by 3 persons who defined the surface defects, the surface roughness, surface smoothness and gloss and is expressed as the average of the 3 assesments by a score between 1-5. 1=bad extrusion quality, 4=acceptable extrusion quality for customers, 5=excellent extrusion quality.

Black speck level was measured on 5 injection moulded parts of 8×8 cm, with a thickness of 2 mm from which the contaminants (black spots) were counted by using an ocular. The contaminants are black spots which are bigger than 0.6 mm and those which are smaller than 0.6 mm. After measuring, the average number of black spots bigger than 0.6 mm and the average number of black spots smaller than 0.6 mm is calculated.

Residence time in the extruder (tr) is the time period measured between the dosing of few pieces of contrasting color granulate together with the thermoplastic polyolefine, the vulcanizable rubber and the curing agent in the entry port of the extruder and the first moment that a change in color at the die exit was noticable.

Specific Energy (Espec) is the mechanical energy in kWh supplied by the motor of the extruder to the thermoplastic elastomer per kg (kW.h/kg) as described in Plastic compounding by DB Todd ISBN 1-56990-236-4.

EXAMPLE I

A mixture of 200 parts of EPDM (Keltan P597™), 33 parts of polypropylene homopolymer with a melt flow index of 1.2 g/10 min, 2 parts stannous chloride, 5 parts phenolic resin (Schenectady SP 1045™), 2 parts zinc oxide and 40 parts talc was dynamically vulcanized at a screw speed of 800 rpm. Additionally 40 parts of oil (Sunpar 150™) was added at the middle of the extruder via injection. The residence time in the extruder was 29 sec, the ratio residence time/(L/D) was 0.55 sec and the ratio Espec/residence time was 39.7 kW/kg. Properties of the dynamically vulcanized thermoplastic elastomers are given in table 1.

EXAMPLE II

Same procedure and composition as in example I but the residence time was 22 sec, the ratio residence time/(L/D) was 0.42 sec and the ratio Espec/residence time was 52.3 kW/kg. Properties of the dynamically vulcanized thermoplastic elastomers are given in table 1.

EXAMPLE III

Same procedure and composition as in example I but the residence time was 18 sec, the ratio residence time/(L/D) was 0.35 sec and the ratio Espec/residence time was 66 kW/kg. Properties of the dynamically vulcanized thermoplastic elastomers are given in table 1.

Comparative Experiment A

Same procedure and composition as in example I but the residence time was 44 sec, the ratio residence time/(L/D) was 0.85 sec and the ratio Espec/residence time was 22.9 kW/kg. Properties of the dynamically vulcanized thermoplastic elastomers are given in table 1.

Comparative Experiment B

Same composition as in example I but the L/D was 44, the residence time was 50 sec, the ratio residence time/(L/D) was 1.14 sec and the ratio Espec/residence time was 20.88 kW/kg. Properties of the dynamically vulcanised thermoplastic elastomers are given in table 1.

TABLE I

Properties of the dynamically vulcanized thermoplastic elastomers

| Example/experiment | I | II | III | A | B |
|---|---|---|---|---|---|
| Screw L/D | 52 | 52 | 52 | 52 | 44 |
| Throughput (lb/hr) | 990 | 1320 | 1650 | 660 | 400 |
| Screw speed (rpm) | 800 | 1000 | 1200 | 500 | 500 |
| Espec (kW h/kg) | 0.32 | 0.32 | 0.33 | 0.28 | 0.29 |
| Residence time (tr) (sec) | 29 | 22 | 18 | 44 | 50 |
| tr/(L/D) (sec) | 0.55 | 0.42 | 0.35 | 0.85 | 1.14 |
| Espec/tr (kW/kg) | 39.7 | 52.3 | 66.0 | 22.9 | 20.8 |
| Hardness (shore A) | 62.7 | 61.5 | 62.1 | 62.6 | 62.4 |
| Density (g/cm$^3$) | 0.978 | 0.984 | 0.982 | 0.972 | 0.981 |
| Tensile Strenght (Mpa) | 5.1 | 5.6 | 5.9 | 5.6 | 5.5 |
| 100% modulus (Mpa) | 2.0 | 2.0 | 2.0 | 2.0 | 1.9 |
| Elongation at break (%) | 435 | 425 | 455 | 418 | 491 |
| Compression set (22 hr/70° C.) | 21.6 | 21.5 | 21.3 | 23.0 | 24.0 |
| Black speck level | 77 | 69 | 58 | 95 | 109 |
| Colour b-value | 22.5 | 21.1 | 19.9 | 23.7 | 22.7 |
| Extrusion quality (1-5) | 4.25 | 4.75 | 4.5 | 4 | 2 |
| Odour | 2.5 | 2.5 | 1.5 | 2 | 1.5 |

As can be seen from the examples I, II and III and comparative experiments A and B in table 1, dynamically vulcanized thermoplastic elastomers have been produced which have a much better black speck level if the residence time in the extruder is less than 40 sec, the ratio of specific Energy (Espec)/residence time is at least 24 kW/kg and the ratio of the residence time/(Length/Diameter) is less than 0.60 sec. Also a better colour and extrusion quality has been achieved. Moreover a better compression set has been received under the above conditions.

The invention claimed is:

1. Process for the preparation of a dynamically vulcanized thermoplastic elastomer comprising melting and mixing a thermoplastic polyolefin, a vulcanizable rubber and a curing agent in a co-rotating twin-screw extruder, whereby the vulcanizable rubber is cured during mixing, wherein tr<40 sec, Espec/tr>=24 kW/kg, tr/(L/D)<0.60 sec, and the rotation speed of each co-rotating twin screw in the extruder varies from 500 to 1200 rpm; and whereby tr means the total residence time in the extruder, Espec means specific Energy (kWh/kg) in the extruder and represents mechanical energy in kWh supplied by an extruder motor to the thermoplastic elastomer per kg, and (L/D) means Length/Diameter ratio of the screws in the extruder.

2. Process according to claim 1, wherein the residence time in the extruder is less than 30 sec.

3. Process according to claim 1, wherein the screw speed is at least 700 rpm.

4. Process according to claim 1, wherein the screw speed is at least 900 rpm.

5. Process according to claim 1, wherein the thermoplastic polyolefin is a homopolymer of ethylene or propylene or a copolymer of ethylene and propylene.

6. Process according to claim 1, wherein the vulcanizable rubber is EPDM or EPM.

7. Process according to claim 1, wherein the rubber is vulcanized to a gel content in excess of 80%.

8. Process according to claim 7, wherein the rubber is vulcanized to a gel content in excess of 95%.

9. Process according to claim 1, wherein the dynamically vulcanized thermoplastic elastomer comprises between 5-35 wt % of the thermoplastic polyolefin.

10. Process according to claim 1, wherein the dynamically vulcanized thermoplastic elastomer comprises between 95-65 wt % of the vulcanizable rubber.

11. Dynamically vulcanized thermoplastic elastomer obtainable by the process according to claim 1.

12. Article comprising the dynamically vulcanized thermoplastic elastomer according to claim 11.

13. Article according to claim 12 in sealing systems, building profiles or extrusion applications.

* * * * *